United States Patent [19]
Stanley

[11] Patent Number: 4,472,670
[45] Date of Patent: Sep. 18, 1984

[54] SIMPLIFIED CONNECTIONS TO CONTROL SPEED RELATING TO ELECTRICAL ROTATING MACHINERY

[75] Inventor: Louis Stanley, Peakhurst, Australia

[73] Assignee: Card-O-Matic Pty. Limited, Australia

[21] Appl. No.: 326,992

[22] Filed: Dec. 3, 1981

[30] Foreign Application Priority Data

Dec. 11, 1980 [AU] Australia .................... PE 6882

[51] Int. Cl.$^3$ .......................................... H02P 7/48
[52] U.S. Cl. .................................. 318/774; 318/775
[58] Field of Search ............... 318/773, 776, 774, 775, 318/772

[56] References Cited

U.S. PATENT DOCUMENTS

| | | | |
|---|---|---|---|
| 1,969,981 | 8/1934 | Janca | 172/278 |
| 2,267,805 | 12/1941 | Appleman | 318/773 |
| 2,341,482 | 2/1944 | Stephan | 318/776 |
| 2,813,239 | 11/1957 | La Cour | 318/776 |
| 2,896,144 | 7/1959 | Mollenberg | 318/776 |
| 2,941,138 | 6/1960 | Ramer | 318/220 |
| 3,111,616 | 11/1963 | Cantonwine | 318/776 |
| 3,207,968 | 9/1965 | King et al. | 318/223 |
| 3,233,160 | 2/1966 | Rawcliffe | 318/224 |
| 3,324,371 | 6/1967 | Stauffer | 318/225 |
| 3,463,988 | 8/1969 | Canadelli | 318/776 |
| 3,619,748 | 11/1971 | Eastham | 318/774 |
| 3,845,553 | 11/1974 | Fields | 30/29 |

FOREIGN PATENT DOCUMENTS 1957779 3/1967 Fed. Rep. of Germany .
1538031 6/1969 Fed. Rep. of Germany .

OTHER PUBLICATIONS

A. E. Fitzgerald, D. E. Higginbotham & A. Grabel, "Alternating-Current Motor Speed Control," *Basic Electrical Engineering*, 5th Ed., pp. 824-826 (McGraw-Hill Book Co., 1981).
J. Rosenblatt and M. H. Friedman, "Speed Control of Induction Motors," *Direct and Alternating Current Machinery*, pp. 257-259 (New York City Community College 1963).
J. Hindmarsh, *Electrical Machines and Their Applications*, Manchester College of Science and Technology.

*Primary Examiner*—David Smith, Jr.
*Attorney, Agent, or Firm*—Townsend and Townsend

[57] ABSTRACT

The present invention discloses AC electrodynamic machines, such as electric motors, which are able to be operated in either a high speed mode or a low speed mode by not energizing one of the windings of the machine or by energizing the one winding so as to induce a magnetic pole of reverse polarity to that conventionally induced, respectively. Methods of operating AC electrodynamic machines are also disclosed.

12 Claims, 7 Drawing Figures

SIMPLIFIED CONNECTIONS TO CONTROL SPEED RELATING TO ELECTRICAL ROTATING MACHINERY

The present invention relates to AC electrodynamic machines, such as AC motors, and in particular provides an AC motor which is easily able to be switched so as to run at one of two or more speeds.

Many devices have been proposed in order to enable AC electric motors to run at different speeds. Such devices include ballasts, various transformers, secondary windings, and overwindings. Each of these arrangements has been successful in its own way in converting an AC electric motor, which is essentially a constant speed device having its speed determined by the frequency of the AC supply and the number of poles in the machine, to run at a plurality of speeds. However the cost of achieving this desirable speed operation has been both the bulk and the expense of the additional above-mentioned components.

It is an object of the present invention to provide an AC electrodynamic machine which is able to operate in both a high speed mode and a low speed mode.

According to one aspect of the present invention there is disclosed an AC electrodynamic machine having a plurality of pairs of windings; each winding, when energised, inducing a magnetic pole; and adjacent windings being arranged to induce magnetic poles of opposite polarity, wherein said machine is operable in a first, high speed, mode with one of said windings unenergised, and wherein said one winding is arranged to be energised to induce a magnetic pole of the same polarity as its adjacent winding to operate said machine in a second, low speed, mode.

According to another aspect of the present invention there is disclosed a method of operating an AC electrodynamic machine having a plurality of pairs of windings; each winding, when energised, inducing a magnetic pole, said method comprising the steps of operating said machine in a first, high speed mode by leaving one winding unenergised and energising the remainder of said windings to induce magnetic poles of opposite polarity by adjacent windings; and operating said machine in a second, low speed, mode by energising said one winding to induce a magnetic pole of the same polarity as its adjacent winding.

Embodiments of the present invention will now be described with reference to the drawings in which.

Figure 1:
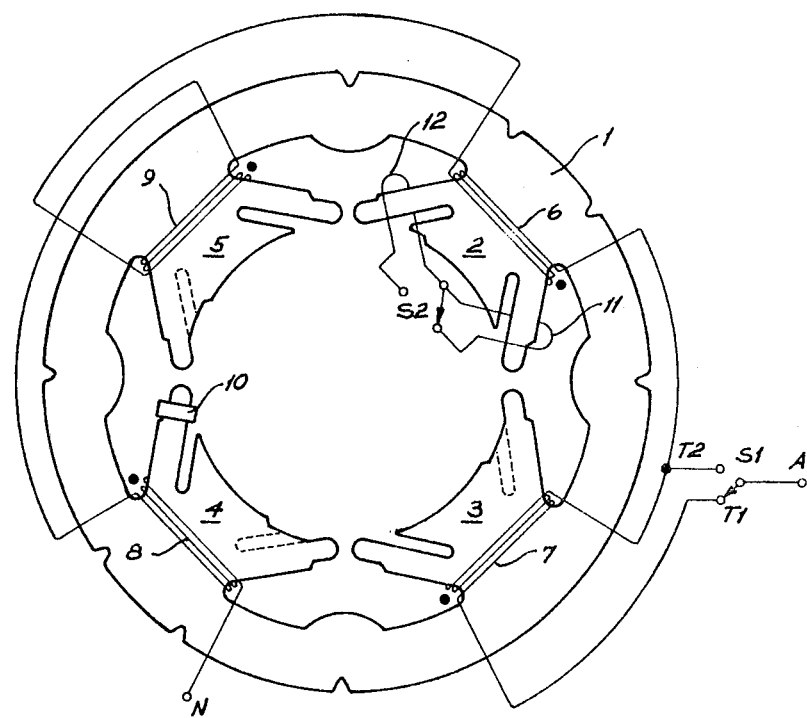
FIG. 1 is a schematic circuit diagram of a four pole, shaded pole motor, the rotor not being illustrated for clarity.

Turning now to FIG. 1, in order to schematically illustrate the electrical and magnetic arrangement of a four pole motor, a stator lamination 1 is illustrated in plan from which it will be seen that the stator has four salient poles 2–5, respectively. Each pole 2–5 is provided with a corresponding winding 6–9, respectively. Each of the windings 6–9 is wound in an identical sense or direction.

The windings 8, 9, 6 and 7 are connected in series as shown between a neutral terminal N and the terminal T1 of a switch S1 which, in the position illustrated, connects the terminal T1 to an active terminal A. Terminal T2 of switch S1 is connected between windings 6 and 7 and switch S1 is operable so as to connect terminal T2, instead of terminal T1, to the active terminal A. It will be apparent that winding 9 is connected in reverse manner to that of the other winding 6, 7 and 8 so that when all four windings 6–9 are energised, pole 5 will have reverse magnetic polarity to that of the other poles 2, 3 and 4.

In a conventional four pole AC electric motor, winding 7 and winding 9 would be connected in identical manner and all four windings would be connected in series across the AC supply, that is between terminals A and N. The effect of this arrangement is to generate a magnetic field between the poles 2–5 with poles 2 and 4 having a like polarity and poles 3 and 5 having a like polarity but a polarity opposite to that of poles 2 and 4. Because alternating current is supplied to the windings, a moving magnetic field is generated in known fashion and the conventional machine is capable of operating as a synchronous motor having a speed determined by the frequency of the AC supply and the number of poles. The machine is also capable of operating as an induction motor, indeed this is the more normal method of operation, in which case the speed of the motor is reduced from the synchronous speed by a factor known as slip.

If the motor of FIG. 1 is operated with switch S1 connecting active terminal A to terminal T2, then winding 7 is not energised, however, windings 6 and 8 are energised so as to create a magnetic field in poles 2 and 4 of like polarity, whilst winding 9 is energised to create a magnetic field of pole 5 of opposite polarity. It has been found that there is no substantial effect in the running operation of the machine by leaving winding 7 unenergised. That is to say, the motor continues to operate at a speed substantially idential to that of a conventional motor. The theory as to why this is so is not fully understood, however, it is believed that the magnetic material present in pole 3 and the circular yoke of lamination 1 result in a magnetic field flowing through pole 3 which has a polarity the same as that flowing through pole 5, even though the magnetic field in pole 3 is not induced therein by winding 7.

It will be apparent to those skilled in the art that because only three windings 6, 9 and 8 are connected in series across the supply it will be necessary to take some action to ensure that the windings do not burn out. Since it is difficult, in practice, to reduce the supply voltage it is therefore desirable to increase the number of turns in the windings above the number of turns in the windings of a conventional machine.

If switch 1 is now switched to the position illustrated in FIG. 1, that is to connect terminal T1 to the active terminal A, then it is apparent that winding 7 will be energised so as to generate a magnetic field within pole 3 of a polarity opposite to that generated in pole 5 by winding 9. The effect of this is to reduce the speed operation of the motor. It is believed that this reduction in speed is brought about by a magnetic braking effect in that the magnetic field induced in pole 3 by winding 7 somehow slows the speed of rotation of the moving magnetic field generated by all four of the poles 2-5. The precise mechanism whereby this reduction in speed is achieved is not yet known.

It has been experimentally determined that if SH is the high speed of the motor in rpm on load operating with switch S1 connecting terminals T2 and A (that is to say that the conventional motor speed), and p is the number of poles, then the low speed SL achieved by operating the motor of FIG. 1 on four poles with the connections illustrated is given by the following formula:

$$SL = SH - SH/p = SH(p-1)(1/p)$$

Thus for a high speed (that is to say three pole operation) of 1200 rpm, the low speed, four pole speed, is as follows:

$$SL = 1200 - 1200/4$$
$$= 1200 - 300$$
$$= 900 \text{ rpm}$$

The preferred number of turns, n, in each of the windings 6-9 can be calculated from the following formula in which nc is the number of turns in each winding of a conventional machine;

$$n = (p \cdot nc + nc)(1/p) = nc(p+1)(1/p)$$

Thus if the conventional motor has, say, 1000 turns per winding then the number of turns per winding, for all four windings 6-9, is calculated as follows:

$$n = (4000 + 1000)(\tfrac{1}{4}) = 1250 \text{ turns.}$$

It has been experimentally determined using a 240 V, 50 Hz system that the above described motor when operating on three poles at the high speed draws 0.5A and uses 100W whereas at the lower speed using all four poles (that is with switch S1 in the position illustrated in FIG. 1) the motor draws 0.53A and uses 102W. Furthermore, since no overwindings are used, the speed of the motor is substantially independent of fluctuations in the supply voltage.

In order to provide a starting mechanism for the motor of FIG. 1, pole 4 is shown provided with a shading turn 10 of substantially conventional form whilst pole 2 is provided with two shading windings 11 and 12, either one of which is short circuited by means of switch S2. With switch S2 in the position illustrated, shading winding 11 is short circuited and thus poles 2 and 4 operate in unison as shaded poles to provide a starting torque for the motor. If desired, both poles 3 and 5 can also be provided with a shading turn 10 (not illustrated) so that all four poles operate as shaded poles.

Once the motor is running, it is possible to operate switch S2 so as to short circuit shading winding 12 and open circuit shading winding 11. The effect of this is to provide a small braking torque which therefore slows the motor, irrespective of whether the motor is operating at the high speed SH or the low speed SL. It is also possible to provide each pole 3, 4, and 5 with the arrangement illustrated in detail on pole 2 (in which case the shading turn 10 of pole 4 is removed). This alternative construction is illustrated by the dashed line on poles 3, 4 and 5 so as to illustrate the slot required in the pole face in order to receive the shading winding.

Figure 2:
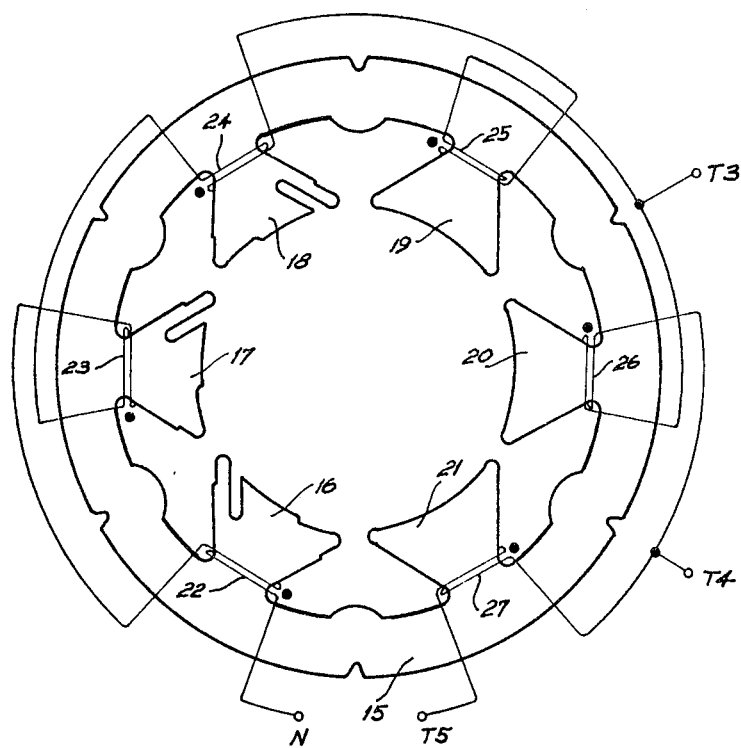
FIG. 2 is an illustration similar to FIG. 1 of a six pole induction motor.

Turning now to FIG. 2, a stator lamination 15 has six salient poles 16-21 each of which carries an identically wound winding 22-27 respectively. The poles 16-21 can be shaded poles as schematically illustrated by poles 16, 17 and 18 or, alternatively, the poles 16-21 can be unshaded poles as schematically illustrated by poles 19, 20 and 21.

The windings 22-27 are connected in series between a neutral terminal N and terminal T5 with adjacent poles being connected in opposite senses, except for windings 26 and 27 which are connected with the reverse sense to that anticipated. A terminal T4 is provided intermediate windings 26 and 27 and a terminal T3 is provided intermediate windings 25 and 26.

The motor operates at high speed when the active of the supply (not illustrated) is connected to terminal T3 thereby leaving windings 26 and 27 unenergised. As before, the high speed of operation is substantially that of a six pole AC electric motor and is therefore determined by the frequency of the supply.

By connecting the active of the supply to the terminal T4, instead of terminal T3, the motor operates at a medium speed owing to the braking effect of winding 26 which is then energised. If, however, the active of the supply is connected to terminal T5, the motor operates at a low speed owing to the combined braking of effects of windings 26 and 27 both of which are energised. The medium speed can be calculated using the formula given above in which the medium speed is given by SL. Once the medium speed has been calculated, the formula given above can also be used to calculate the low speed using the medium speed as an input. Thus the speed formula given above can be used in an iterative fashion. The winding formula used above is applied directly in order to ascertain the increased number of turns required for each of the windings 22-27.

It will be apparent that the abovedescribed arrangement is particularly advantageous since it results in an AC motor having three speeds, the motor being easily switchable between the speeds by means of either mechanical or electronic switching arrangements (not illustrated) which will be obvious to those skilled in the art. Furthermore, the motor can be either a synchronous or an induction motor since the details of the rotor are not relevant to the speed at which the motor operates, save that if the motor operates as an induction motor, the speed of rotation of the rotor below synchronous speed will be reduced by slip. Furthermore, the starting arrangements of the motor are not illustrated since again these are not relevant to the speed operation. The motor can be a shaded pole motor, a capacitor start and run motor, a capacitor start motor, or a split phase motor, or the like.

Figure 3:
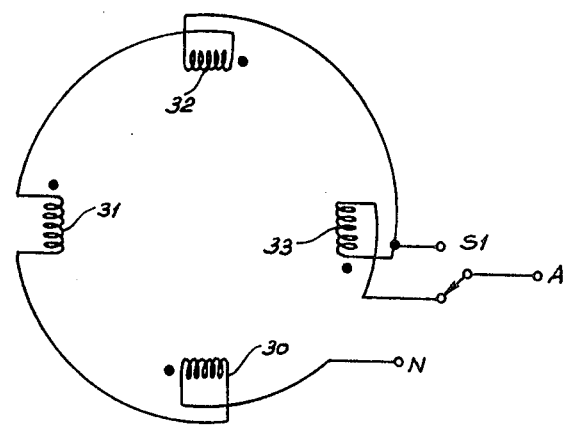
FIG. 3 is a circuit diagram illustrating the interconnections of the windings of a four pole machine similar to that illustrated in FIG. 1.
Figure 4:
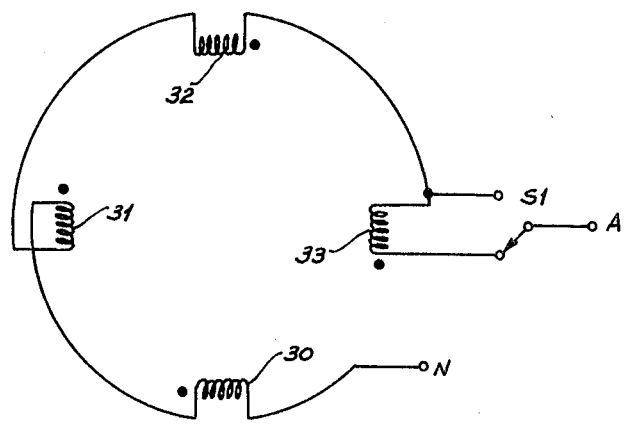
FIG. 4 is an alternate arrangement to that illustrated in FIG. 3.

FIG. 3 illustrates one form of winding arrangement for a four pole, two speed AC electric motor, only the running windings being illustrated. The four windings 30-33 are wound with the end connections of windings 30, 32 and 33 being reversed. This reversal of end connections requires additional labour and extra space so that an identical electrical performance can be achieved by means of the arrangement shown in FIG. 4 in which both windings 30 and 32 are uncrossed, winding 31 is crossed and winding 33, the low speed winding, is uncrossed in order to have a reverse connection to that of the opposite winding 31. It will be apparent from FIG. 4 that only winding 31 being crossed, the arrangement of FIG. 4 which corresponds to that shown in FIG. 1, comprises the more economical way of arranging the windings of a four pole machine.

Figure 5:
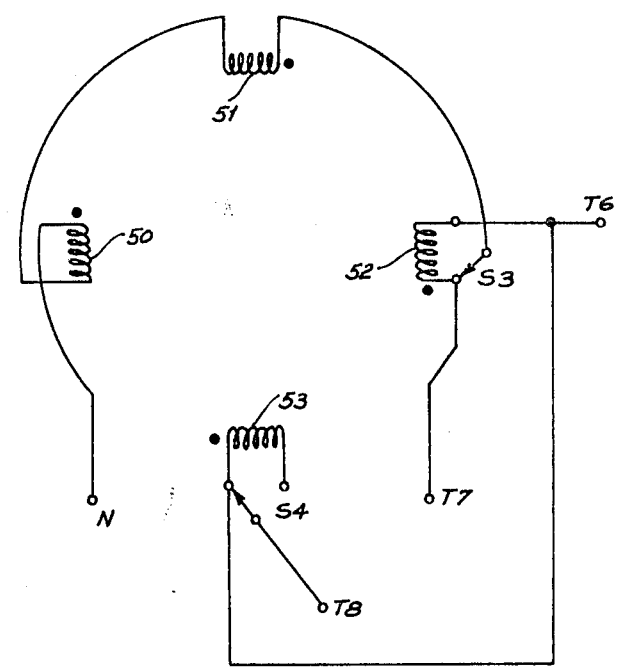
FIG. 5 is a circuit similar to FIGS. 3 and 4 but permitting multi-speed operation.

Turning now to FIG. 5, the interconnections of the running windings of a four speed, for pole electric machine are illustrated. Four windings 50–53 inclusive are provided with windings 50 and 51 being connected to induce opposite magnetic polarities. The neutral terminal N is connected to one end of the winding 50 whilst three possible active terminals T6, T7 and T8 are provided as are two switches S3 and S4.

The highest speed at which the motor of FIG. 5 can operate is as a standard two pole machine. This configuration is achieved by connecting the active of the supply to terminal T6 and moving switch S3 from the position illustrated to the position at which terminal T6 is directly connected to winding 51.

The next lowest speed is that of a slowed two pole machine, this configuration being achieved by energising three poles. Under this arrangement, the active of the supply is connected to terminal T7 and switch S3 is moved from the position illustrated so that terminal T6 is directly connected to winding 51. Thus windings 51 and 52 are connected together in series and so as to induce identical magnetic polarities.

The next slowest speed is that of a conventional four pole motor save that this arrangement is achieved by energising only three windings. This arrangement is achieved by connecting the active of this supply to terminal T8, by leaving switch S3 in the position illustrated and leaving switch S4 also in the position illustrated. In this way, windings 51 and 52 are connected together in series but with reverse induced magnetic polarities. Winding 53 is not energised.

Finally, the slowest speed able to be achieved is equivalent to that of a slowed four pole motor and this is achieved by energising all four windings. With the active of the supply connected to terminal T8, switch S4 is moved to the right, from its position illustrated in FIG. 5 whilst switch S3 remains in the position illustrated in FIG. 5. Thus windings 53 and 52 are connected together in series and with the same induced magnetic polarity, this polarity being opposite to that of the polarity of winding 51.

Figure 6:
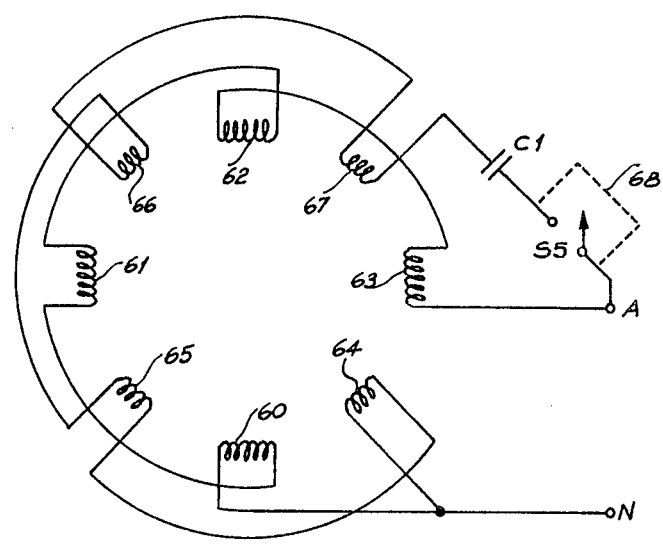
FIG. 6 is a circuit diagram for a four pole capacitor start motor or a four pole capacitor start and run motor.

In FIG. 6, both the starting and running windings of a four pole motor are illustrated. Four windings 60–63 are provided and are termed the running windings, whilst four further windings 64–67, termed the starting windings, are also provided. The starting windings 64–67 are displaced by 90 electrical degrees relative to the running windings 60–63 respectively. In addition, a capacitor C1 is connected in series with the starting windings 64–67 so as to provide an additional phase shift between the magnetic field produced by the starting windings 64–67 and the magnetic field produced by the running windings 60–63. This phase shift between two magnetic fields produces a rotating magnetic field which induces electric currents in the rotor (not illustrated) of the induction motor thereby providing a starting torque. If desired, the starting windings 64–67 can be switched out of the circuit after starting by means of a centrifugal switch S5 in which case the motor is a capacitor start induction motor. If the switch is S5 is replaced by a permanent link 68 indicated by means of a dashed line in FIG. 6, then the induction motor is known as a capacitor start and run induction motor.

Figure 7:
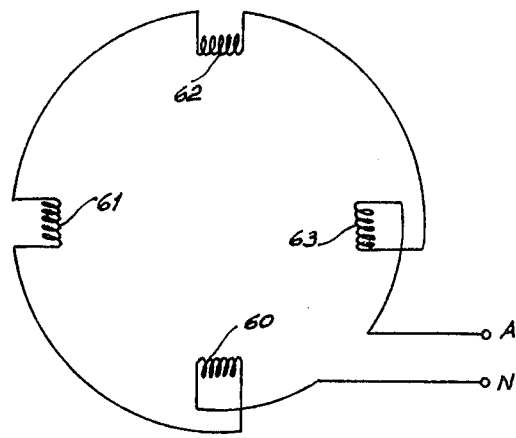
FIG. 7 is a circuit diagram illustrating the winding connections for conversion of a four pole motor to a two pole motor.

In order to switch the motor of FIG. 6 so as to provide for two speed operation, the magnetic polarity of running windings 62 and 63 are reversed as illustrated in FIG. 7 so as to convert from four pole operation, and hence speed, to two pole operation and two pole speed.

It will be apparent to those skilled in the art that since the two pole operation illustrated in FIG. 7 results in adjacent windings 61 and 62 inducing the same magnetic polarity and adjacent windings 63 and 60 both inducing the opposite magnetic polarity, the arrangement of FIG. 7 is more suited to non-salient pole machines having distributed windings. Furthermore, if link 68 is provided (that is the induction motor is a capacitor start and run motor) then it is also necessary to switch the connections of starting windings 66 and 67. However, if switch S5 if provided and the motor is a capacitor start motor, since switch S5 is normally a centrifugally operated switch, and the operating speed of a four pole motor is less than that of a two pole motor, the starting arrangements can be left unaltered.

The foregoing describes only some embodiments of the present invention and modifications, obvious to those skilled in the art, may be made thereto without departing from the scope of the present invention.

What I claim is:

1. An AC electrodynamic machine having a plurality of pairs of salient pole windings; each winding, when energized, inducing a magnetic pole; and adjacent windings being arranged to induce magnetic poles of opposite polarity, wherein said machine is operable in a first, high speed, mode with all but one of said windings energised, and wherein to operate said machine in a second, low speed mode, said one winding is arranged to be energised to induce a magnetic pole of the same polarity as its adjacent winding, the ratio of the high speed to the low speed being substantially equal to the ratio of the number of poles to the number of poles less one.

2. A machine as claimed in claim 1 having four or more salient pole windings including said one winding, wherein said machine includes an additional winding adjacent said one winding, wherein to operate said machine in said high speed mode said additional winding is not energised, and wherein to operate said machine in said low speed mode said additional winding is not energised and said one winding is arranged to be energised to induce a magnetic pole of the same polarity as its adjacent energised winding.

3. A machine as claimed in claim 2 wherein said machine is also operable in said low speed mode with said additional winding arranged to be energised to induce a magnetic pole of the same polarity as said induced pole of said one winding.

4. A machine as claimed in claim 2 wherein to operate said machine in an additional low speed mode said additional winding is arranged to be energised to induce a magnetic pole of reverse polarity to said induced pole of said one winding.

5. A machine as claimed in claim 1 comprising an AC electric motor.

6. A machine as claimed in claim 5 selected from the class consisting of synchronous motors and induction motors including capacitor start induction motors, shaded pole induction motors, split phase induction motors, and capacitor start and run induction motors.

7. A machine as claimed in claim 1 having shaded poles and switch means to short circuit either one of two shading windings located one to each side of each pole.

8. A method of operating an AC electrodynamic machine having a plurality of pairs of salient pole windings; each winding, when energised, inducing a magnetic pole, said method comprising the steps of operating said machine in a first, high speed, mode by not energising one of said windings and energising the remainder of said windings to induce magnetic poles of opposite polarity by adjacent windings; and operating said machine in a second, low speed mode by energising said one winding to induce a magnetic pole of the same polarity as its adjacent winding, the ratio of the high speed to the low speed being substantially equal to the ratio of the number of poles to the number of poles less one.

9. A method as claimed in claim 8 wherein said machine has four or more salient pole windings including said one winding, wherein said machine includes an additional winding adjacent said one winding wherein said machine is operated in said high speed mode with said additional winding not being energised, and wherein said machine is operated in said low speed mode with said additional winding not being energised and said one winding being energised to induce a magnetic pole of the same polarity as its adjacent energised winding.

10. A method as claimed in claim 9 wherein said machine is operated in said low speed mode with said additional winding energised to induce a magnetic pole of the same polarity as said induced pole of said one winding.

11. A method as claimed in claim 9 wherein said machine is operated in an additional low speed mode with said additional winding being energised to induce a magnetic pole of reverse polarity to said induced pole of said one winding.

12. A method as claimed in claim 8 wherein said machine is an AC electric motor.

* * * * *